March 24, 1953 J. H. ALLEN 2,632,450
PIPE CLEANER COUPLING
Filed May 12, 1951
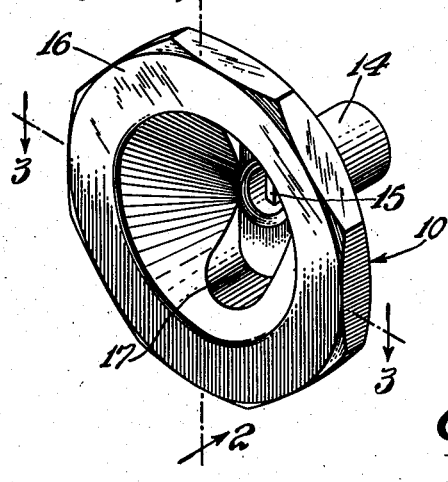
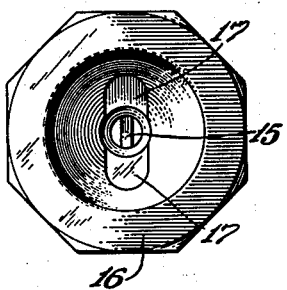
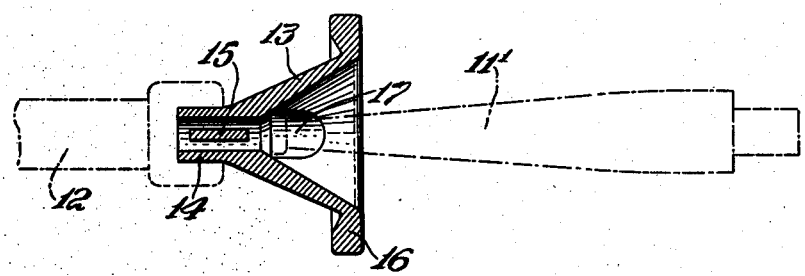
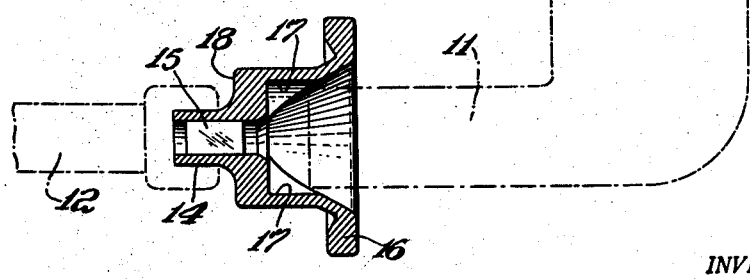
INVENTOR.
JOHN H. ALLEN
BY
ATTORNEY Patented Mar. 24, 1953

2,632,450

UNITED STATES PATENT OFFICE 2,632,450

PIPE CLEANER COUPLING

John H. Allen, Verona, N. J.

Application May 12, 1951, Serial No. 226,046

1 Claim. (Cl. 131—244)

This invention relates to devices for cleaning pipes. The conventional pipe consists of two sections which may be manually separated for cleaning purposes, and the conventional method of cleaning these sections is to utilize elongated absorbent cleaner rods. This method is both tedious and inefficient.

Pursuant to the present invention, a pipe cleaner coupling is provided, by means of which the user may connect the pipe sections to a compressed air line to pass compressed air therethrough, instantaneously and thoroughly cleaning the sections.

The coupling of my invention embodies novel structural features which are hereinafter more particularly described and set forth in the appended claim, including means for keying the end of the pipe stem section which marks the pipe end proper within the coupling to register the same axially therein, a tapered hollow socket of funnel-shaped cross-section to receive the other stem section and axially align the same therein and to accommodate pipe stem sections of various diameters, a tubular segment at the narrow end of the socket portion and a trip vane axially disposed in said tubular segment to actuate the stem of the compressed air line valve.

The coupling of my invention is further provided with a shouldered portion and an outwardly directed flange to facilitate the handling thereof.

In the drawings:

Fig. 1 is a perspective view of the pipe cleaner coupling embodying my invention, Fig. 2 is an end elevational view thereof, taken on line 2—2 of Fig. 1, Fig. 3 is a longitudinal, sectional view, taken on line 3—3 of Fig. 1, and showing the narrow end of the pipe stem section (in dotted lines) positioned in the internal slot of the socket 13 of the coupling, showing also the compressed air line 12 (in dotted lines) positioned on the tubular segment 14, and Fig. 4 is a similar sectional view, taken on line 2—2 of Fig. 1, showing the other pipe section (likewise in dotted lines), disposed in the socket.

In the drawings, the pipe cleaner 10 of my invention is shown to comprise a tapered hollow socket 13 of funnel-shaped cross-section (Fig. 3), having a tubular segment 14 at the narrow end thereof. A trip vane 15 is disposed in said tubular segment coaxially thereof and slightly inwardly of the free end thereof. The coupling is provided with an outwardly directed circumferential flange 16 at the wide end, disposed at right angles to the longitudinal axis thereof, to facilitate handling thereof, and is provided medially thereof internally with a slot 17 disposed at right angles to the longitudinal axis of the coupling, to receive the narrow end of the pipe section 11' to key the same therein, for the purpose of connecting said section axially to the compressed air line for cleaning the section. When the parts are juxtaposed as shown in Fig. 3, the stem of the valve of the compressed air line 12 will be tripped by contact with the vane 15, and the pipe stem section 11' will be instantaneously cleaned. A similar procedure is followed for the purpose of cleaning the other pipe stem section 11, as shown in Fig. 4. The coupling is provided with a shouldered part 18 which will provide an effective means for gripping the same.

By providing a sufficiently large enough keying arrangement as disclosed in the drawing, smoking pipe bits of various sizes can be keyed in the coupling.

The socket 13 is of funnel-shaped internal cross-section to accommodate pipe sections of various diameters.

Having thus described my invention, what I claim as new and desire to secure by Letters Patent is:

A coupling for connecting an end of a smoking pipe stem section with a compressed air line valve, said coupling comprising a hollow funnel-shaped body tapering towards one end and at its smaller end terminating in a tubular extension of dimensions adapting the latter to be inserted into the valve of a compressed air line, a valve operating vane in said tubular extension, said hollow funnel shaped body being formed with opposed internal recesses at the juncture of the body and the tubular extension to define coacting faces that engage opposite edge portions of a bit of a smoking pipe stem for keying the latter in the coupling, and an outstanding flange formed at the larger end of the funnel shaped body providing gripping means for the coupling.

JOHN H. ALLEN.

REFERENCES CITED

The following references are of record in the file of this patent:

UNITED STATES PATENTS

| Number | Name | Date |
|---|---|---|
| 1,124,936 | May | Jan. 12, 1915 |
| 1,419,106 | Bentley | June 6, 1922 |
| 1,869,059 | Hanson | July 26, 1932 |
| 2,114,419 | Slocumb | Jan. 17, 1939 |
| 2,485,780 | Schechter | Oct. 25, 1949 |

FOREIGN PATENTS

| Number | Country | Date |
|---|---|---|
| 11,497 | Great Britain | of 1888 |
| 16,845 | Great Britain | of 1889 |